3,336,236
AQUEOUS COLLOIDAL SiO₂ SOLS STABILIZED
AGAINST BACTERIAL CONTAMINATION
Raymond J. Michalski, Riverdale, Ill., assignor to Nalco
Chemical Company, Chicago, Ill., a corporation of
Delaware
No Drawing. Filed Dec. 23, 1964, Ser. No. 420,779
2 Claims. (Cl. 252—313)

ABSTRACT OF THE DISCLOSURE

The specification of this invention discloses the use of sodium chlorite as a bactericide in aqueous colloidal silica sols.

---

The instant invention releates to a method of protecting aqueous colloidal silica sols from bacterial contamination, and to the resultant protected sol materials therefrom.

It has recently been discovered that colloidal materials comprising colloidal silica particles as the dispersed phase and water as the continuous phase are particularly susceptible to bacterial contamination. The contaminated products at a minimum have an off-odor, and in many instances due to the state of contamination cannot be suitably employed in their desired additive end-use. Moreover, because of the character of the silica sol material, and particularly its alkaline pH, a number of prior art preservatives have been found to possess little, if any effectiveness, in combating this problem of bacterial contamination of aqueous silica sols It therefore becomes an object of the invention to provide a simple and economical method of preventing bacterial growth and contamination of colloidal aqueous silica sol systems.

Another object of the invention is to provide aqueous colloids of silica protected against harmful effects of bacterial growth and resultant product contamination. Other objects will appear hereinafter.

In accordance with the invention it has been found that colloidal aqueous silica sols are protected from bacterial contamination by incorporating therein sodium chlorite in an amount at least sufficient to inhibit growth and reproduction of the bacteria. The bacteria controlled sol compositions may be formed by simply adding sodium chlorite in the desired amount to a silica aquasol. Reverse addition may also be carried out, though ordinarily the preferred method is the above in view of the extremely small amounts of sodium chlorite necessary to carry out an effective program of control.

It has been determined that extremely minute amounts of sodium chlorite are necessary to effect bacterial control. Generally from about 10 parts of sodium chlorite per million parts of aquasol up to about 1000 parts per million parts achieve the desired situation of freedom from bacterial contamination. More preferably, 25–200 p.p.m. are employed for reasons of economy and effectiveness. Since the sodium chlorite itself exhibits no odor alone or in combination with the aquasol, amounts of additive even higher than those just stated may be employed without fear of producing a non-acceptable product because of its unpleasant odor.

More specifically, the invention may be carried out by adding sodium chlorite in solid, concentrated or dilute aqueous form or in any suitable form to the aquasol to provide desired dosage of bacteria control agent. In the most preferred embodiment, a dilute aqueous solution of sodium chlorite, and preferably 0.1–25% solids by weight, is added to the aquasol to be protected.

The resultant sodium chlorite-aquasol product is thus protected against future bacterial contamination. Likewise, it has been discovered that already contaminated aquasols may have their total bacterial count quickly and materially reduced by inclusion of sodium chlorite in proper amounts until an acceptable product is achieved.

The sodium chlorite is effective against any type of bacteria including gram positive and gram negative organisms, embracing such species as Pseudomonas and Bacillus The sodium chlorite inclusion reduces or completely eliminates putrefaction, slime build-up, discoloration, undesirable acceleration of silica precipitation or particle agglomeration, and general product degradation.

Since colloidal aqueous silica sols are generally stored in bulk, such as in drums, for considerable lengths of time, protection from bacterial contamination is particularly necessary in such instances. It has been found that sol inclusion of sodium chlorite during such periods of storage prevents any of the just discussed problems from occurring and protects the aquasol through such storage period up until time of end use. Through a series of studies involving accelerated storage tests, it has been found that aqueous silica sols may be suitably protected by sodium chlorite contact for periods of many months at both room and elevated temperatures.

The type of products which are controlled by sodium chlorite introduction are sols containing non-agglomerated silica particles dispersed in a continuous aqueous liquid phase The silica particles are dense, spherical, colloidally dispersible particles having diameters ranging from about 5 to about 150 millimicrons and more often from about 5 to about 30 millimicrons.

More specifically, aqueous colloidal silica sols are usually prepared by utilizing the teachings of Bird, U.S. 2,244,325. This patent teaches the treatment of dilute alkali metal silicate solutions with cation exchange resins in the hydrogen form to remove substantially all the alkali metal from the silicate. The products produced by the Bird ion exchange method are most frequently dilute, e.g., 1–4% by weight solutions of colloidal silica. Since silica sols of this type are too dilute to be economically utilized in the processes of the invention, it is expedient that they be concentrated to a point whereby the silica concentration is between about 5% and 60% by weight silica, expressed as $SiO_2$. Several methods have been described for conveniently concentrating silica sols of the type produced by Bird. In particular, reference may be made to U.S. Patents 2,574,902; 2,680,721 and 2,929,790. By using the teachings of these patents, which effectively employ a constant volume evaporation technique, it is possible to produce commercially utilizable aqueous colloidal silica sols which have silica concentrations ranging between 20% and 60% by weight.

Aqueous silica sols of the type just described are usually stabilized by adjusting the silica to alkali metal ratio, expressed as $SiO_2:Na_2O$, so that it is at most 130:1 and preferably in the range of 70:1 to 100:1. The alkali adjusted sols are, therefore, alkaline in character having a pH ranging from about 8.0 to about 11.0 and more often from 8.5 to 10.5. The following table lists typical sols which may be protected in the practice of the invention and which are available under the trade name of "Nalcoag". Physical and chemical properties of these types of silica sols are set forth below.

TABLE I

| | Sol I | Sol II | Sol III |
|---|---|---|---|
| Percent colloidal silica as $SiO_2$ | 30 | 35–36 | 49–50 |
| pH | 10.2 | 8.6 | 9.0±.1 |
| Viscosity at 77° F. c.p.s. | <5 | <5 | 20–30 |
| Specific gravity at 68° F. | 1.205 | 1.205 | 1.385 |
| Average surface area, $M.^2$ per gram of $SiO_2$ | 190–270 | 135–190 | 120–150 |
| Average particle size, millimicrons | 11–16 | 16–22 | 20–25 |
| Density, #/gallon at 68° F. | 10.1 | 10.5 | 11.6 |
| Freezing point, ° F. | 32 | 32 | 32 |
| $Na_2O$ percent | 0.40 | 0.10 | 0.30 |

The bacterial-protected aquasols can be used for any type process end-use to which aquasols themselves are generally subjected. This includes use in adhesives, paints, textile coatings, carpet treatments, floor waxes and coatings and the like. Also, it is understood, of course, that the compositions of the invention may include other materials such as dispersants, emulsifiers, extenders and the like.

The following examples are presented by way of illustration, and are not to be taken as limiting the invention which is solely defined by the appended claims.

*Example I*

To one aliquot of a freshly prepared batch of colloidal aqueous silica sol containing about 35% by weight of silica solids was added 100 p.p.m. of sodium chlorite. After one week the total bacterial count was 2,000, exactly the same as initially determined. The control sample of this sol batch, involving no bacterial control treatment had a total bacterial count of 2–10 million after one week with an accompanying strong sulfide odor.

*Example II*

In this series of studies an already contaminated sample of a 50% aqueous silica sol was stored at 98° F. and studied via bacterial counts after various storage periods. Aliquots of the contaminated sample were treated with various dosages of sodium chlorite, and as well, control sample was followed involving no bacterial control program. Results in terms of total bacterial count are as follows. The initial bacteria count was approximately 5 million.

TABLE II

| Dosage Sodium Chlorite, p.p.m. | Bacteria Counts | | | |
|---|---|---|---|---|
| | Two Weeks | Three Weeks | Four Weeks | Two Months |
| 25 | ¹ 2.2 | | | |
| 50 | 4,000 | | | |
| 50 | | 1,200 | | |
| 25 | | 7,000 | | |
| | | ¹ 1.2 | | |
| 50 | | | 300 | |
| 25 | | | 900 | |
| | | | 950,000 | |
| 25 | | | | 3,000 |
| 50 | | | | 200 |
| 100 | | | | 10 |
| | | | | 200,000 |

¹ Millions.

*Example III*

In this experiment, an aqueous silica sol containing about 50% silica was adjusted and found to have a total bacteria count of 3 million. Upon treatment with 100 p.p.m. of sodium chlorite, the bacteria count went down to 700 after 4–5 hours. Moreover, the former unpleasant odor was obviated upon sodium chlorite treatment.

*Example IV*

In this series of tests another contaminated sample of a 50% aqueous silica sol having an initial total bacteria count of 4 million was stored at 98° F. with and without benefit of sodium chlorite treatment. Results are as follows.

TABLE III

| Chemical Dosage, p.p.m. | Two Weeks | Three Weeks | One Month | 1½ Months |
|---|---|---|---|---|
| 50 | 250,000 | 50,000 | 30,000 | 7,500 |
| 100 | 40,000 | 20,000 | 20,000 | 5,500 |
| Control | ¹ 4 | ¹ 5.2 | ¹ 3.9 | 450,000 |

¹ Millions.

*Example V*

In this example, a well-known preservative, sodium hypochlorite, was employed and surprisingly was found to be unsuitable for a number of reasons. In the first place, a definite objectionable chlorine odor developed at dosage levels of 50–100 p.p.m., well within normal use dosages. Also, it was noted that after a period of time the sodium hypochlorite quickly lost its effectiveness in controlling bacterial growth. As an example, in a 50% aqueous sol, treated at a dosage level of 50 p.p.m. sodium hypochlorite, after two weeks time the total bacteria count had been reduced from 5 million to 900. However, after one month's storage the total bacteria count had abruptly risen to 450,000. This led to a non-acceptable product which either had to be discarded or treated with the additive of the instant invention before being released for process end-use.

The invention is hereby claimed as follows:

1. A composition stabilized against bacterial contamination consisting essentially of a major amount of an aqueous colloidal silica sol characterized as containing from 20 to 60% by weight of silica, expressed as $SiO_2$, an average particle size diameter of from about 5 to 150 millimicrons and a pH within the range of from 8.0 to 11.0 and from 10–1,000 parts per million parts by weight of the sol of sodium chlorite.

2. The composition of claim 1 wherein the sodium chlorite is present in an amount of 25–200 parts per million parts by weight of the sol.

References Cited

UNITED STATES PATENTS 2,071,091   2/1937   Taylor     167—17
3,148,110   9/1964   McGahen     167—26

LEON D. ROSDOL, *Primary Examiner.*

SAMUEL H. BLECH, *Examiner.*

R. D. LOVERING, *Assistant Examiner.*